US009135798B2

(12) United States Patent
Sakagami et al.

(10) Patent No.: US 9,135,798 B2
(45) Date of Patent: Sep. 15, 2015

(54) VEHICLE PERIPHERY MONITORING DEVICE

(75) Inventors: Yoshiaki Sakagami, Saitama (JP);
Christian Goerick, Seligenstadt (DE);
Jan Fritsch, Muehlheim am Main (DE);
Bernd Heisele, Mountain View, CA (US)

(73) Assignee: Honda Motor Co., Ltd., Tokyo (JP)

( * ) Notice: Subject to any disclaimer, the term of this patent is extended or adjusted under 35 U.S.C. 154(b) by 424 days.

(21) Appl. No.: 13/602,130

(22) Filed: Sep. 1, 2012

(65) Prior Publication Data

US 2014/0063248 A1    Mar. 6, 2014

(51) Int. Cl.
H04N 7/18          (2006.01)
G08B 13/22         (2006.01)
G08G 1/16          (2006.01)
G06K 9/00          (2006.01)

(52) U.S. Cl.
CPC ............ *G08B 13/22* (2013.01); *G06K 9/00798* (2013.01); *G06K 9/00805* (2013.01); *G06K 9/00825* (2013.01); *G08G 1/166* (2013.01)

(58) Field of Classification Search
CPC .................. G08G 1/096708; G08G 1/096716; G08G 1/096725; G08G 1/017; B06Q 1/525; B06Q 1/52; G01S 13/931; G01S 2013/9342; G01S 2013/9346; B06R 1/00; G05D 1/0231
USPC ................. 340/901, 904, 937, 988, 436, 437; 701/23, 25, 26, 28, 300, 301; 348/118, 348/119, 148
See application file for complete search history.

(56) References Cited

U.S. PATENT DOCUMENTS

| 6,057,754 A * | 5/2000 | Kinoshita et al. ............. 340/435 |
| 6,661,449 B1 * | 12/2003 | Sogawa ........................ 348/113 |
| 8,629,903 B2 | 1/2014 | Seder et al. |
| 2004/0167717 A1 * | 8/2004 | Buchanan et al. ............ 701/301 |
| 2008/0059037 A1 * | 3/2008 | Isaji et al. ....................... 701/93 |

(Continued)

FOREIGN PATENT DOCUMENTS

| DE | 10 2008 062916 A1 | 6/2010 |
| DE | 10 2010 013224 A1 | 3/2011 |
| JP | 2009-042941 A | 2/2009 |

OTHER PUBLICATIONS

German Office Action dated Feb. 24, 2015 issued in DE Patent Application 10 2013 217 370.9 with the English translation thereof.

(Continued)

*Primary Examiner* — Victor Kostak
(74) *Attorney, Agent, or Firm* — Carrier Blackman & Associates, P.C.; Joseph P. Carrier; William D. Blackman

(57) ABSTRACT

A vehicle periphery monitoring device 1 is equipped with a first recognizing unit 11 which recognizes a shape of a road in a traveling direction of a self vehicle C, a second recognizing unit 12 which recognizes a position of an object M existing in a periphery of the self vehicle C, an estimating unit 13 which estimates a moving direction of the object M from the position recognized by the second recognizing unit 12, and a contact avoiding process unit 15 which determines whether or not to perform an avoiding process for avoiding contact between the self vehicle C and the object M, on the basis of a relationship between the shape of the road recognized by the first recognizing unit 11 and the moving direction of the object M estimated by the estimating unit 13.

15 Claims, 11 Drawing Sheets

(56) References Cited

U.S. PATENT DOCUMENTS

| | | | |
|---|---|---|---|
| 2008/0243389 A1* | 10/2008 | Inoue et al. | 701/301 |
| 2010/0076621 A1* | 3/2010 | Kubotani et al. | 701/1 |
| 2010/0104199 A1* | 4/2010 | Zhang et al. | 382/199 |
| 2011/0246156 A1 | 10/2011 | Zecha et al. | |
| 2012/0268602 A1* | 10/2012 | Hirai et al. | 348/148 |
| 2012/0283895 A1* | 11/2012 | Noda | 701/1 |
| 2014/0341432 A1* | 11/2014 | Ichida | 382/103 |

OTHER PUBLICATIONS

German Search Report dated Feb. 24, 2015 issued in DE Patent Application 10 2013 217 370.9.

* cited by examiner

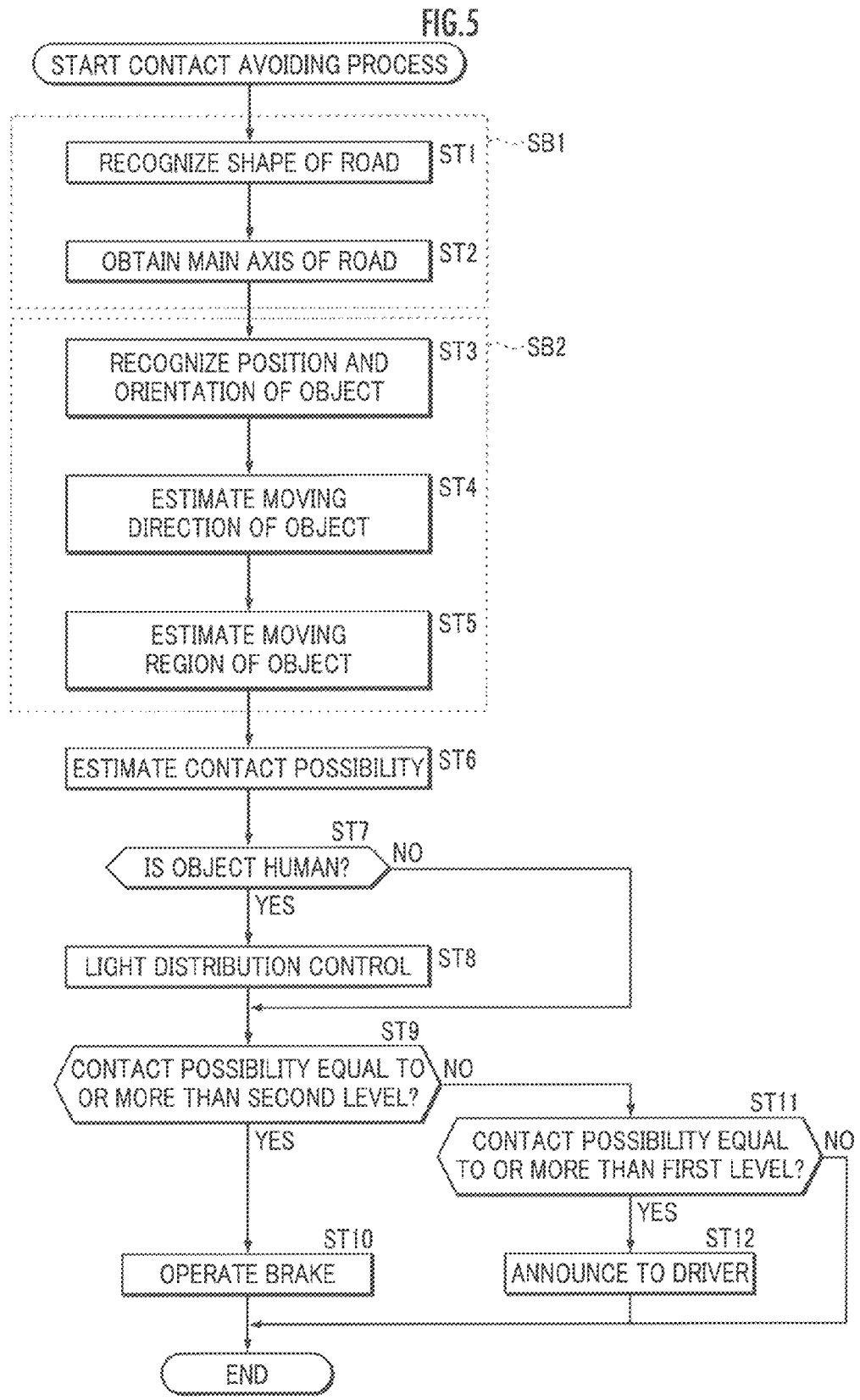

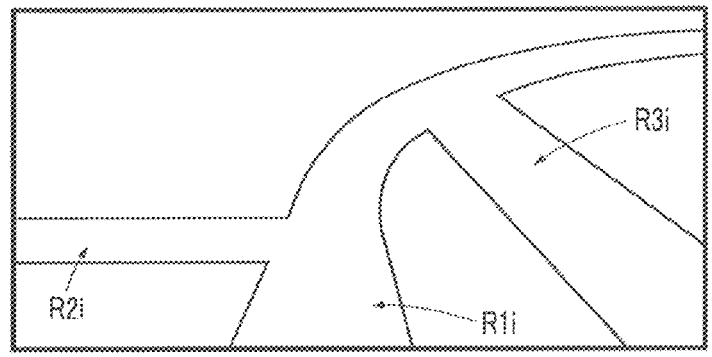
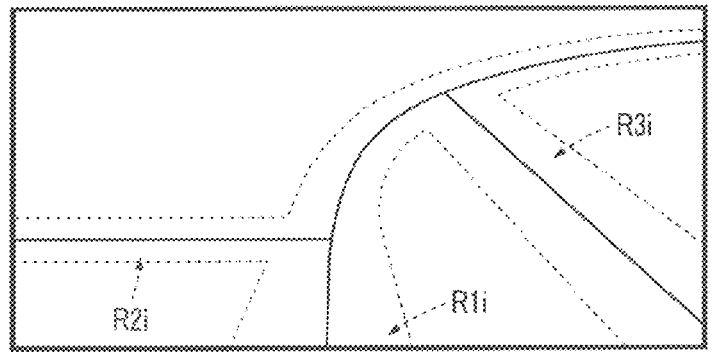
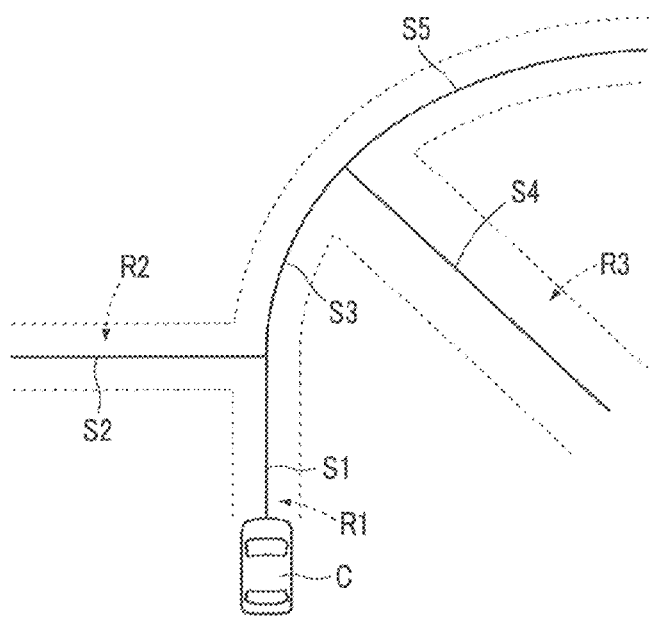

VEHICLE PERIPHERY MONITORING DEVICE

BACKGROUND OF THE INVENTION

1. Field of the Invention

The present invention relates to a vehicle periphery monitoring device which monitors an object existing in a periphery of the vehicle.

2. Description of the Related Art

Conventionally, a vehicle periphery monitoring device which evaluates a contact possibility of a self vehicle and an object (monitoring object) existing in a periphery thereof, and alarms a driver (Japanese Patent Laid-Open No. 2009-42941) has been known. The vehicle periphery monitoring device evaluates that there is a possibility of the vehicle contacting the object, in the case where the object is positioned inside a region (monitoring region) set in front of the vehicle.

If the monitoring region is set in front of the vehicle, as is in the vehicle periphery monitoring device of Japanese Patent Laid-Open No. 2009-42941, there are cases where the alarm is made, for example when the object is positioned inside the monitoring region but actually has little possibility of the vehicle contacting the object owing to the moving state of the object. As such, it is conceivable that the moving state of the self vehicle and the object, and the like, are in various states, and it is desired that the vehicle periphery monitoring device performs alarming and the like more appropriately according to various states.

SUMMARY OF THE INVENTION

The present invention has been made in view of such background, and aims at providing a vehicle periphery monitoring device capable of appropriately determining whether or not to perform a process for avoiding a vehicle from contacting an object, such as alarming.

The present invention is a vehicle periphery monitoring device which monitors an object existing in a periphery of a vehicle, comprising: a first recognizing unit configured to recognize a shape of a road in a traveling direction of the vehicle; a second recognizing unit configured to recognize a position of an object existing in a periphery of the vehicle; an estimating unit configured to estimate the traveling direction of the object from the position recognized by the second recognizing unit; and a contact avoiding process unit configured to determine whether or not to perform an avoiding process for avoiding contact of the vehicle and the object, on the basis of a relationship between the shape of the road recognized by the first recognizing unit, and the traveling direction of the object estimated by the estimating unit.

According to the present invention, the contact avoiding process unit determines whether or not to perform the avoiding process, on the basis of the relationship between the shape of the road in the traveling direction of the vehicle recognized by the first recognizing unit, and the moving direction of the object estimated by the estimating unit. As such, even in the situation where the vehicle is traveling on a road of a curved shape and the like, which is a situation where it would be difficult to determine the contact possibility if a monitoring region is set in front of the vehicle regardless of the shape of the road, it becomes possible to appropriately determine whether or not to perform the avoiding process of avoiding the vehicle from contacting the object.

In the present invention, it is preferable that the device further comprises an imaging device which takes an image of the periphery of the vehicle, wherein the second recognizing unit recognizes an orientation of the object on the basis of an image imaged by the imaging device, and the estimating unit estimates the orientation of the object recognized by the second recognizing unit as the moving direction of the object, in the case where an amount of change of the position of the object at different times which is recognized by the second recognizing unit is equal to or less than a predetermined value.

According to the present invention, even in the case where the amount of change of the position of the object in different times is equal to or less than a predetermined value, such as in the case where the vehicle is stopping, and it is difficult to estimate the moving direction from the change in the position of the object, it becomes possible to estimate the direction of the object supposed as having high possibility, as the moving direction of the object, by the estimating unit. Further, by doing so, it becomes possible to determine whether or not to perform the avoiding process, supposing a case where the object in a stopped state suddenly moves.

In the present invention, it is preferable that the contact avoiding process unit estimates a region in which the object moves according to the moving direction of the object estimated by the estimating unit, and determines whether or not to perform the avoiding process, in the case where the estimated area crosses a course of the vehicle estimated on the basis of the shape of the road recognized by the first recognizing unit.

The region estimated by the estimating unit is the region supposed that the object is going to move from now, so that in the case where the region crosses the course of the vehicle, it is conceivable that there is a possibility that the vehicle contacts the object. Therefore, it becomes possible to determine whether or not to perform the avoiding process and to appropriately perform the avoiding process according to the possibility, in the case where there is a possibility of the vehicle contacting the object when the region estimated that the object moves from now crosses the estimated course of the vehicle.

In the present invention, it is preferable that the contact avoiding process unit estimates a region in which the object moves according to the moving direction of the object estimated by the estimating unit, and determines not to perform the avoiding process, in the case where the estimated region does not cross the estimated course of the vehicle. By doing so, it becomes possible to suppress meaningless avoiding process from being performed, in the case where it is conceivable that there is no possibility of contact between the vehicle and the object.

In the present invention, it is preferable that contact avoiding process unit changes the content of the avoiding process, according to a level of contact possibility estimated on the basis of the estimated course of the vehicle, the estimated region, a velocity of the vehicle, and a velocity of the object.

The avoiding process to be performed at present differs by the course of the vehicle, the region in which the object moves, the vehicle, and the relative relationship between the vehicle and the object. For example, the avoiding process to be performed at present differs, according to the difference in time until the vehicle and the object respectively reaches the point where the course of the vehicle and the region in which the object moves crosses.

Therefore, for example, it becomes possible to differ the avoiding process by estimating the time until the vehicle and the object respectively reaches the point where the course of the vehicle and the region in which the object moves crosses, according to at least either of the moving velocity and the acceleration of the vehicle and the object, respectively, and on the basis of the difference between the estimated time of the vehicle and the object. By changing the content of the avoiding process according to the relative relationship, it becomes possible to perform appropriate avoiding process according to the relationship.

In the present invention, it is preferable that the contact avoiding process unit performs a process of announcing by an announcing device equipped to the vehicle, as the avoiding process, in the case where the level of contact possibility is equal to or more than a first predetermined level, and performs a process of braking the vehicle with a braking device equipped to the vehicle, as the avoiding process, in the case where the level is equal to or more than a second predetermined level which is higher than the first predetermined level.

By doing so, in the case where the possibility of the vehicle contacting the object is equal to or more than the first predetermined level, by announcing the driver that there is the possibility, then it becomes possible to make the driver recognize the possibility at an early stage, and to urge operation for avoiding contact. Further, in the case where the possibility of the vehicle contacting the object is increasing to equal to or more than the second predetermined level, it becomes possible to surely avoid the contact between the vehicle and the object, by braking the vehicle.

In the present invention, it is preferable that the device further comprises a third recognizing unit configured to recognize whether or not the object recognized by the second recognizing unit is a human, and wherein the contact avoiding process unit performs a process of making an irradiating direction of a headlight equipped to the vehicle to a direction in which the human is irradiated, as the avoiding process, in the case where the object is recognized as the human by the third recognizing unit.

By doing so, by irradiating the human by the headlight, it becomes possible to make it easier for the driver to visually recognize the person to whom the vehicle has possibility of contacting, and to increase the effect of avoiding contact.

BRIEF DESCRIPTION OF THE DRAWINGS

FIG. 5 is a flow chart showing a contact avoiding process executed by the vehicle periphery monitoring device of the present embodiment;

FIG. 6(a) is a view in which a shape of the road is recognized from the image imaged by the camera of the self vehicle, (b) is a view in which a thinning process is performed from the view in (a), and (c) is a view showing a main axis of the road in real space on the basis of the view in (b);

DETAILED DESCRIPTION OF THE PREFERRED EMBODIMENTS

An embodiment of the present invention will be explained with reference to FIG. 1 through FIG. 11.

(Configuration of Vehicle)

Figure 1:
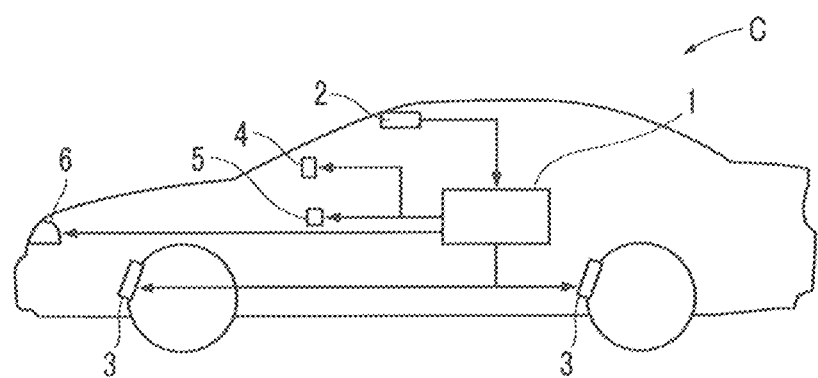
FIG. 1 is a conceptual diagram of a vehicle including a vehicle periphery monitoring device of the present embodiment of the present invention.

FIG. 1 shows a vehicle C to which a vehicle periphery monitoring device 1 is equipped. The vehicle C is equipped with the vehicle periphery monitoring device 1, a camera 2, a brake 3, a display 4, a loudspeaker 5, and a headlight 6.

The vehicle periphery monitoring device 1 is configured from an electronic control unit (configured from a CPU, a ROM, a RAM, an I/O circuit and the like).

The camera 2 is an imaging device such as a monocular camera or a stereo camera, which takes an image of a periphery of the vehicle C. The camera 2 is arranged at a front portion of the vehicle C so as to take an image of front of the vehicle C. The camera 2 may be configured to take an image, in addition to the front of the vehicle C, rearward of the vehicle C. The camera 2 outputs imaged information (hereinafter referred to as "captured image") to the vehicle periphery monitoring device 1.

The brake 3 (corresponds to a braking device of the present invention) performs braking of the vehicle C, under the control of the vehicle periphery monitoring device 1.

The display 4 (corresponds to an announcing device of the present invention) is arranged in front of a driver's seat (not shown) of the vehicle C. By displaying images according to signals output from outside, the display 4 announces various information to a driver.

The loudspeaker 5 (corresponds to the announcing device of the present invention) is arranged in a vehicle interior of the vehicle C. By generating sound according to signals output from outside, the loudspeaker 5 announces various information to the driver.

The headlight 6 is a front lamp for irradiating the front of the vehicle C, and is configured to be capable of changing an irradiating direction, according to a predetermined control signal for performing a light distribution control.

(Function of Vehicle Periphery Monitoring Device)

Figure 2:
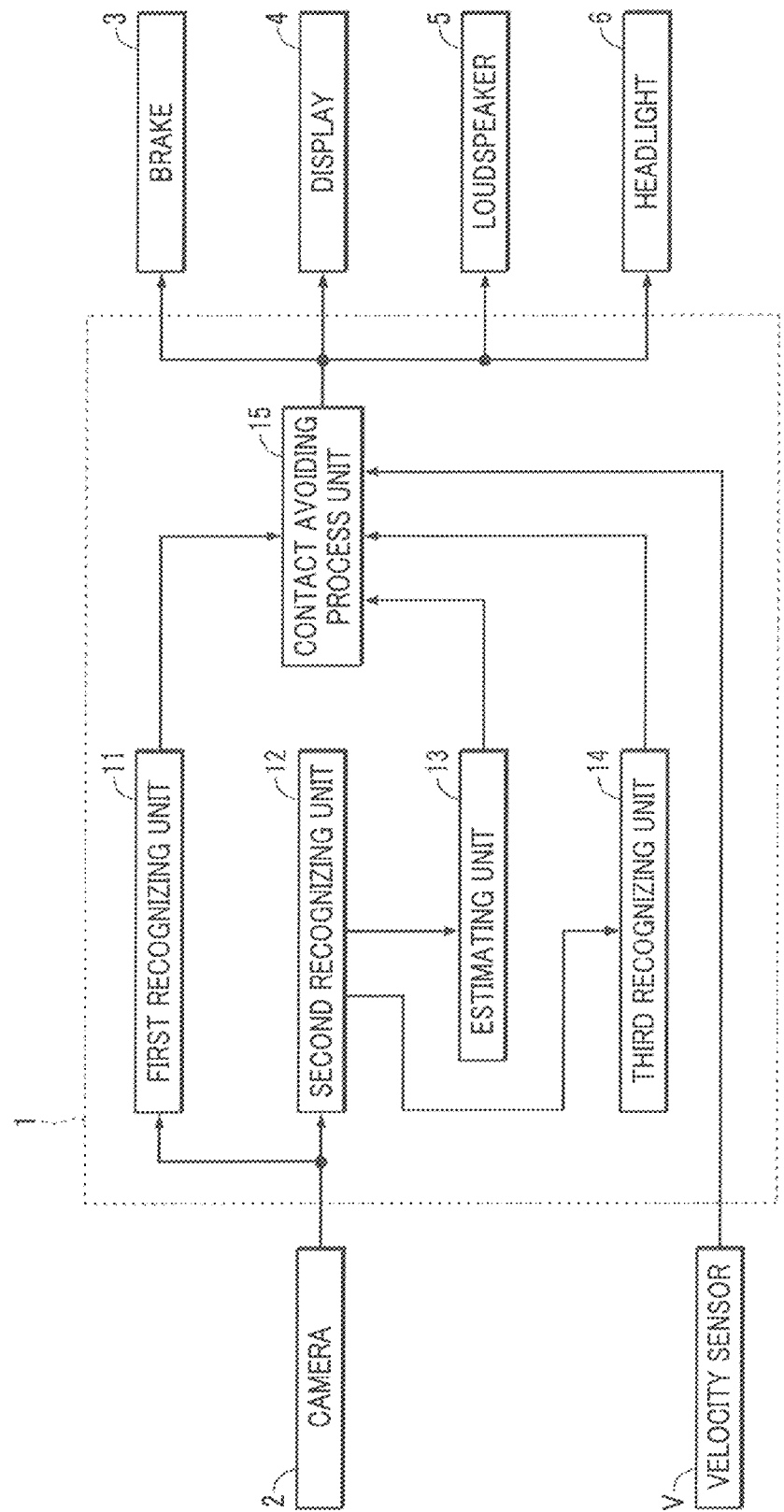
FIG. 2 is a configuration diagram of the vehicle periphery monitoring device of the present embodiment.

FIG. 2 shows a functional block diagram of the vehicle periphery monitoring device 1. By executing a control program for vehicle periphery monitoring which is stored in the ROM of the electronic control unit, with the CPU, the vehicle periphery monitoring device 1 functions as a first recognizing unit 11, a second recognizing unit 12, an estimating unit 13, a third recognizing unit 14, and a contact avoiding process unit 15.

The first recognizing unit 11 recognizes a shape of a road in a traveling direction of the vehicle C, on the basis of the captured image by the camera 2 (process of step ST1 in FIG. 5 to be explained later). The second recognizing unit 12 recognizes a position of an object M existing in the periphery of the vehicle C, on the basis of the captured image by the camera 2 (process of step ST3 in FIG. 5 to be explained later).

The estimating unit 13 estimates a moving direction of the object M from the position of the object M recognized by the second recognizing unit 12 (process of step ST4 in FIG. 5 to be explained later). The third recognizing unit 14 recognizes whether or not the object M recognized by the second recognizing unit 12 is a human (a pedestrian) (process of step ST7 in FIG. 5 to be explained later).

The contact avoiding process unit 15 determines whether or not to perform an avoiding process for avoiding contact of the vehicle C and the object M, according to the shape of the road recognized by the first recognizing unit 11 and the moving direction of the object M estimated by the estimating unit 13, and in the case where it is determined to perform the avoiding process, performs the avoiding process (process of steps ST6 through ST12 in FIG. 5 to be explained later).

Although details thereof will be explained later, in the present embodiment, the contact avoiding process unit 15 is configured to execute, as the avoiding process, at least either of a process of braking the vehicle C by operating the brake 3, and a process of announcing to the driver by the announcing device (the display 4 and the loudspeaker 5). In the present embodiment, as the process of announcing by announcing device, a process of indicating information on the display 4 to the driver, and a process of playing sound from the loudspeaker 5 to the driver, are performed. At this time, in the case where it is recognized that the object M is a human by the third recognizing unit 14, the contact avoiding process unit 15 performs the light distribution control of the headlight 6 (process of steps ST7 through ST8 in FIG. 5 to be explained later).

As is explained above, the contact avoiding process unit 15 determines whether or not to perform the avoiding process, according to the moving direction of the object M and the shape of the road.

Hereinafter, the process by the above-mentioned units 11 through 15 will be explained in detail with reference to FIG. 3 through FIG. 9.

(Periphery of Self Vehicle)

In the following explanation, the vehicle C as a subject of the explanation is called "a self vehicle C". First, explanation will be given on the shape of the road on which the self vehicle C is traveling and the periphery thereof, which is used mainly in the explanation of the present embodiment. As is shown in FIG. 3, the self vehicle C is traveling on a road (hereinafter referred to as "a first road") R1 which makes a rightward curve in a traveling direction (direction from bottom to top of FIG. 3).

In the traveling direction of the self vehicle C, the first road R1 branches to a second road R2 and a third road R3. In the traveling direction of the self vehicle C, the second road R2 branches so as to run leftward from the first road R1. Further, in the traveling direction of the self vehicle C, the third road R3 branches so as to run rightward at a distant point than the second road R2.

Figure 3:
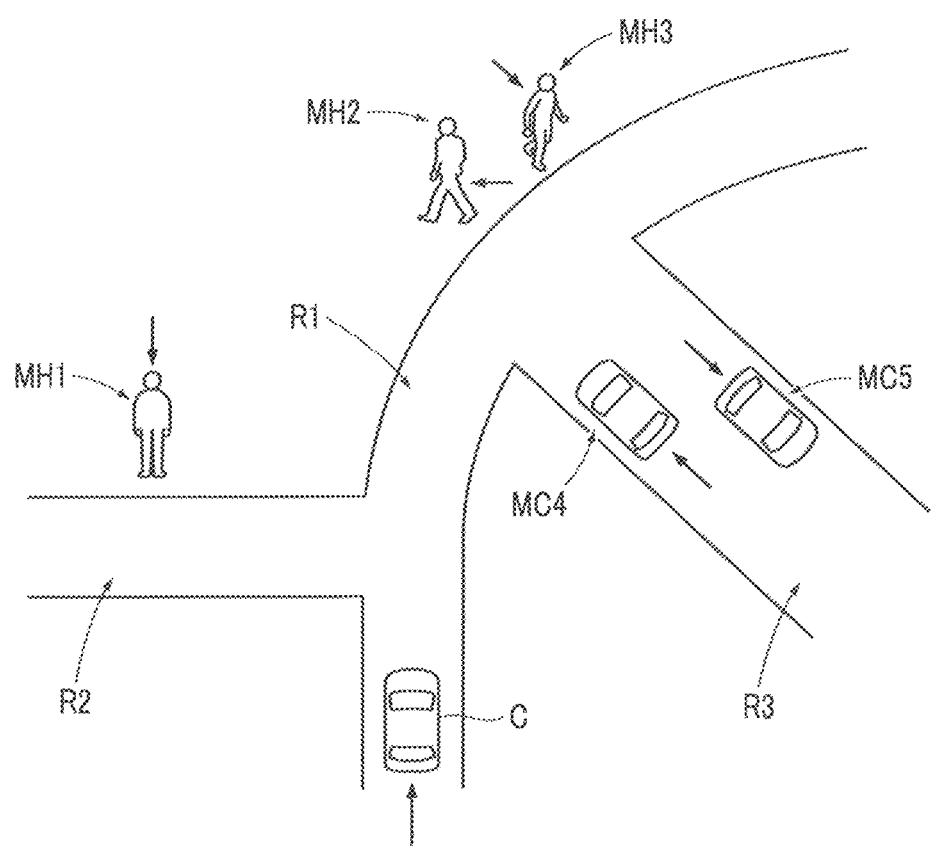
FIG. 3 is a view showing a periphery of a road on which a vehicle including the vehicle periphery monitoring device is traveling.

Further, as is shown in FIG. 3, five objects M (MH1, MH2, MH3, MC4, and MC5) exist at the periphery of the self vehicle C. Three objects, pedestrian MH1 through pedestrian MH3, are human (pedestrians). Two objects, other vehicle MC4 and other vehicle MC5, are vehicles (other vehicles).

The pedestrian MH1 is positioned at a side diagonally forward left of the self vehicle C and also at the opposite side of the second road R2 (upper side in FIG. 3). Further, the pedestrian MH1 is moving in downward direction in FIG. 3, that is, towards the second road R2. The pedestrian MH2 is positioned at left side of the road R1 forward of the self vehicle C and at a position where the first road R1 is curving rightwards. Further, the pedestrian MH2 is moving in leftward direction in FIG. 3, that is, away from the first road R1 and the third road R3, and moving in parallel to the second road R2 at a point distant from the second road R2.

The pedestrian MH3 is positioned, of the left side of the road R1 forward of the self vehicle C and at a position where the first road R1 is curving rightwards, near the right of the pedestrian MH2 when viewed from the self vehicle C. Further, the pedestrian MH3 is moving in a lower right direction in FIG. 3, that is, towards the first road R1.

The other vehicle MC4 is positioned on the third road R3 and also diagonally forward right of the self vehicle C. Further, the other vehicle MC4 is moving on the third road R3 in upper left direction in FIG. 3, that is, towards the first road R1. The other vehicle MC5 is positioned on the third road R3 and also diagonally forward right of the self vehicle C. Further, the other vehicle MC5 is moving on the third road R3 in lower right direction in FIG. 3, that is, away from the first road R1.

Figure 4:
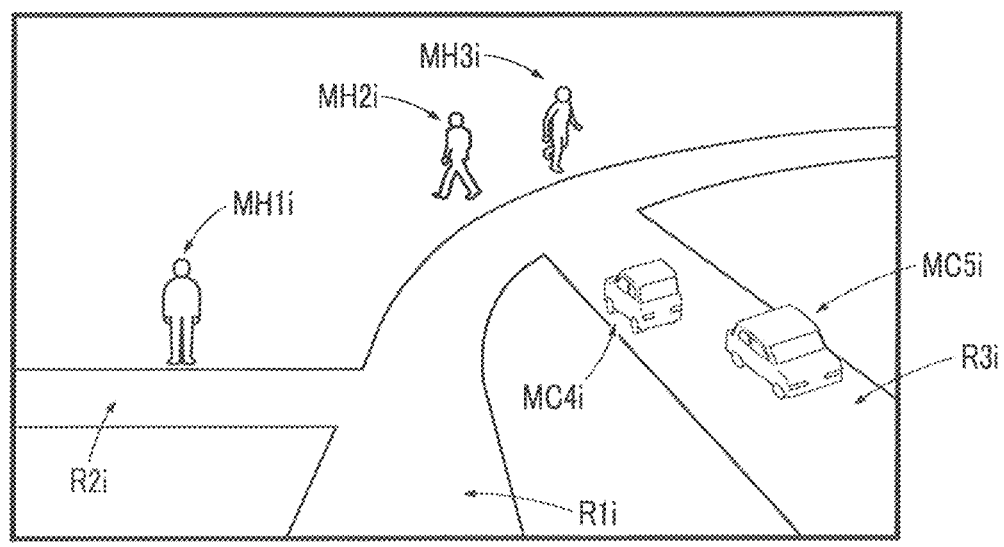
FIG. 4 is a view showing an image imaged by a camera of a self vehicle in the periphery in FIG. 3.

An image captured by the camera 2 of the self vehicle C under the above-explained situation is shown in FIG. 4. The vehicle periphery monitoring device 1 performs a control process shown in FIG. 5, on the basis of the captured image as shown in FIG. 4.

In the following explanation, "i" will be affixed to the end of the reference number of the object, when the image portion of each object in the captured image of the camera 2 is being indicated. Further, with respect to the object, in order to clarify whether it is the object in the real space or the object in the captured image, the object in the captured image will be called "object image". For example, for the object MH1 in real space (refer to FIG. 3), the image portion of the object MH1 in the captured image by the camera 2 will be identified as the object image MH1*i* (refer to FIG. 4.).

(Process of the Vehicle Periphery Monitoring Device)

Subsequently, an execution procedure of the process executed by the vehicle periphery monitoring device 1 will be explained according to the flowchart shown in FIG. 5. By executing the process according to the flowchart in each predetermined control cycle, the vehicle periphery monitoring device 1 performs the avoiding process for avoiding contact according to the possibility of the self vehicle C contacting the object M.

In the present flowchart, with a first process SB1 in steps ST1 through ST2, the vehicle periphery monitoring device 1 recognizes the shape of the road (ST1), and obtains a main axis S of the road from the shape. Further, with a second process SB2 in steps ST3 through ST5, the vehicle periphery monitoring device 1 recognizes the position and orientation of the object (ST3), and thereafter estimates the moving direction of the object (ST4), and estimates a moving region of the object M on the basis of the estimated moving direction (ST5).

Thereafter, according to the main axis S of the road obtained from the shape of the road in the first process SB1, and the moving direction of the object M estimated by the second process SB2, the vehicle periphery monitoring device 1 estimates a possibility of the self vehicle C contacting the object M (hereinafter referred to as "contact possibility) (ST6), and in the case where the object M is a human, performs the light distribution control of the headlight 6 (ST7 through ST8), and also performs the avoiding process for avoiding contact of the self vehicle C and the object M according to the level of contact possibility (ST9 through ST12).

From the process mentioned above, it becomes possible to appropriately determine whether or not to perform the avoiding process.

In the flowchart of FIG. 5, for the sake of illustration, the second process SB2 is shown as being processed after the first process SB1, however, the either of the two processes may be processed earlier than the other. Further, the two processes of the first process SB1 and the second process SB2 may be processed in parallel to one another.

Hereinafter, the details of the flowchart shown in FIG. 5 will be explained.

First, in step ST1, the first recognizing unit 11 of the vehicle periphery monitoring device 1 recognizes the shape of the road in the traveling direction of the self vehicle C (forward) on the basis of the captured image of the camera 2 as is shown in FIG. 4. Various methods already well-know may be used therefor. For example, the method disclosed in Japanese Patent Laid-Open No. H06-94470 may be used. By doing so, a profile of the road in the traveling direction of the self vehicle C, as is shown in FIG. 6(a), may be obtained, and the image data showing the shape which could recognize the shape of the road may be obtained from the outline.

Subsequently, the process proceeds to step ST2, the region of the road estimated from the shape of the road recognized in step ST1 is converted to pixel values equivalent to the outline, and thereafter a thinning process is performed thereto. The thinning process is a process, for example, for converting a binarized image into a linear image with a width of 1 pixel. By doing so, for example, the image shown in solid line in FIG. 6(b) may be obtained from the image shown in FIG. 6(a). In FIG. 6(b), for the sake of understanding, the shape of the road indicated in FIG. 6(a) is shown in a broken line.

The image shown in FIG. 6(b) is an image in the same direction as the direction where the forward of the self vehicle C is captured by the camera 2. To the linear image performed with the thinning process, the first recognizing unit 11 approximates each segment (a line connecting between a branch and a branch of each line in the linear image) with a curve (for example, a quadric curve and the like), and the like. Thereafter, the position in the image of each segment approximated is converted to a position in the real space.

The position in the real space is a position (X, Y, Z) in a real space coordinate system (XYZ coordinate system) set taking a center of the point in which the camera 2 is arranged on the front of the self vehicle C as a point of origin. The X direction and the Y direction in the real space coordinate system is the lateral direction (vehicle width direction) and the vertical direction of the self vehicle C, and the X direction and the Y direction are the same directions as the x direction (cross direction) and the y direction (longitudinal direction) of the captured image. Further, the Z direction of the real space coordinate system is the anteroposterior direction of the self vehicle C.

Conversion of the position in the image date into the position in the real space (position in the real space coordinate system) may be performed using, for example, the method disclosed in Japanese Patent Laid-Open No. 2009-42941. In the method disclosed in Japanese Patent Laid-Open No. 2009-42941, a disparity between two imaging devices are used. However, even with one imaging device (for example, the monocular camera), the position in the image data may be converted to the position in the real space if the distance between the camera and the object M is known. The distance between the camera and the object M may be obtained, for example as is disclose in Japanese Patent Laid-Open No. 2009-42941, on the basis of a plurality of time-series data.

As is explained above, the position in the real space of five segments S1 through S5, taking the self vehicle C as the reference, as is shown in FIG. 6(c), may be obtained. In the present embodiment, each approximated segments S1 through S5 are defined as the main axes S of the road. The present embodiment is based on the premise that the self vehicle C moves along any of the main axes S of the road obtained as is explained above.

Subsequently, the step proceeds to step ST3, and the position and the orientation of the object M is recognized on the basis of the captured image by the camera 2. First, the second recognizing unit 12 of the vehicle periphery monitoring device 1 detects the position in the real space (position in a global coordinate system) of one or a plurality of the objects M from the captured image (hereinafter referred to as "object position detecting process"). Further, the second recognizing unit 12 recognizes orientations of each of one or a plurality of the objects M (hereinafter referred to as "object orientation recognizing process"), on the basis of each position of the detected one or a plurality of the objects M. Hereinafter, these processes will be explained in detail.

First, explanation will be given on the object position detecting process. The second recognizing unit 12 extracts from the binarized image obtained by binarizing the captured image by the camera 2, each image portions of one or a plurality of the object images Mi by performing a labeling process and the like. Thereafter, on the basis of the image portion of each object image Mi in the extracted binarized image, the second recognizing unit 12 extracts the image portion of each object image Mi in the captured image by the camera 2 as each region of one or a plurality of the object images Mi. Thereafter, on the basis of the position of the extracted region in the captured image, and an installed posture and the like of the camera 2, the second recognizing unit 12 recognizes the position in real space of the object M corresponding to the region.

The object position detecting process is not limited to the one in the present embodiment, and any method may be used as long as it is capable of recognizing the position of each object M. For example, in the case of recognizing the position of each object M on the basis of an image captured by a monocular camera, the method disclosed in Japanese patent Laid-Open No. 2009-42941 may be used. Further, for example, in the case of recognizing the position of each object M on the basis of an image captured by a stereo camera, a method disclosed in Japanese Patent Laid-Open No. H11-51645 may be used.

Next, explanation will be given on the object orientation recognizing process. In the process, the second recognizing unit 12 recognizes the orientation of each object image Mi in the captured image, on the basis of the position of the object image Mi in the captured image which is recognized by object position detecting process in the process of recognizing the position of the object M in the real space, and the captured image. Thereafter, the second recognizing unit 12 recognizes the orientation of the object M in the real space, on the basis of the orientation of each object image Mi in the captured image and the installed posture and the like of the camera 2.

The second recognizing unit 12 prepares a plurality of images of those which may be conceivable as the object M, for example, human, bicycle, vehicle, or animals other than human, and the like, the images facing each of a plurality of orientations (for example, front side, rear side, left side, and right side, and the like), uses a plurality of the images as input data for a machine learning, and recognizes the orientation of each object image Mi using output data obtained by the machine learning. The machine learning is conducted beforehand, and the output data obtained by the learning is stored and held in a memory device such as a ROM. In the present embodiment, as one method of the machine learning, a support vector machine is used. The object orientation recognizing process is not limited to the one in the present embodiment, and any method may be used as long as it is capable of recognizing the orientation of each object M.

Next, the process proceeds to step ST4, and estimates the moving direction of the object M. The estimating unit 13 of the vehicle periphery monitoring device 1 estimates the moving direction of the object image Mi, on the basis of the captured images at a plurality of time series (at different times). Hereinafter, the captured image at the present control cycle is represented by Dt, and the captured image at a control cycle earlier by n is represented by Dt-n.

The estimating unit 13 estimates, in each captured image in a plurality of the time series from the captured image Dt-n of the control cycles earlier by n from the present to the captured image Dt of the present control cycle, the direction in which the position of the identical object image Mi detected by the process in step ST3 changed, as the moving direction of the object image Mi. At this time, n may be an arbitrary value, and in the present embodiment, is set to, for example, 1.

Thereafter, the estimating unit 13 converts the moving direction in the captured images of each object image Mi estimated as above, into the moving direction of each object M in the real space, on the basis of the arrangement posture of the camera 2.

Next, the process proceeds to step ST5, and the region in which the object M is supposed to move (hereinafter referred to as "object moving region") is estimated. Hereinafter, estimation of the object moving region will be explained. First, the vehicle periphery monitoring device 1 obtains an intersection point P (for example, refer to P1, P3, and P4 in FIG. 7) of a straight line d (for example, d1, d3, and d4 in FIG. 7) which indicates the moving direction of each object M estimated in step ST4, and the main axis S (for example, S1 through S5 in FIG. 7) of the road extracted in step ST2, from each object M. Thereafter, the vehicle periphery monitoring device 1 defines a circle which has a central point at the intersection point P, and a radius of W/2. In this case, W is the width of the self vehicle C. Thereafter, the vehicle periphery monitoring device 1 estimates a region MR which is obtained by combining a region surrounded by two common tangents circumscribing the circle defined as above and the object M, the circle defined as above, and the object M, with each region of the circle defined as above and the object M, or a region MR of a substantially fan-shape taking the object M as a center thereof and including the circle defined as above, as the object moving region (for example, refer to MR1, MR3, and MR4 in FIG. 7).

At this time, the vehicle periphery monitoring device 1 does not estimate the object moving region MR for the object M which does not have the intersection P (for example, the pedestrian MH2 and the other vehicle MC5 in the present embodiment).

Next, the process proceeds to step ST6, and the possibility of the self vehicle C contacting the object M (hereinafter referred to as "contact possibility" is estimated, according to a relative relationship between the position where the main axis S of the road extracted in the process of step ST2 (that is, a course of the vehicle) intersects with the region MR estimated by the process of step ST5, and the self vehicle C. The process after step ST6 will not be performed to the object M to which the moving region was not estimated (MH2 and MC5).

Figure 7:
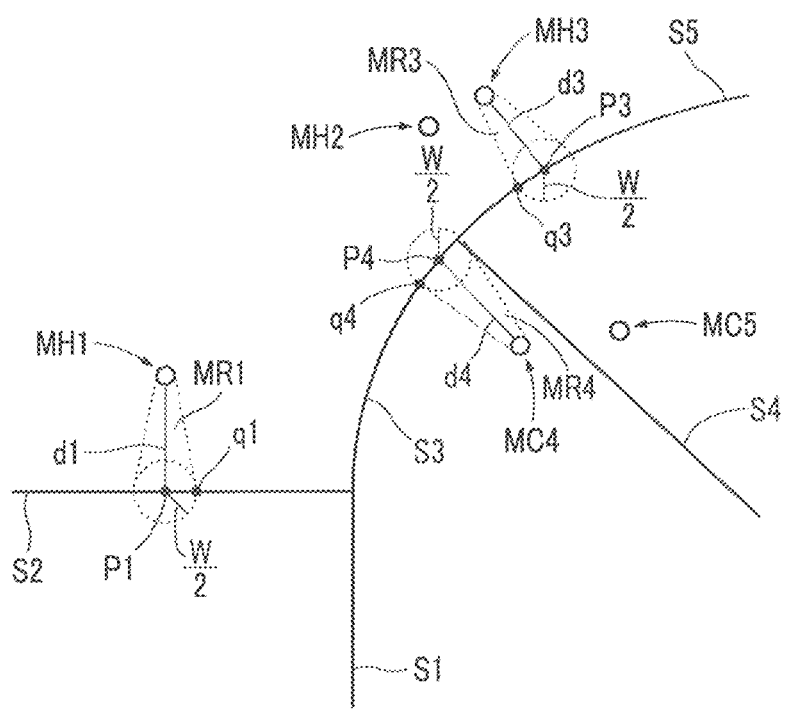
FIG. 7 is a view showing an estimation of region in which each object moves, in the periphery of FIG. 3.

First, the contact avoiding process unit 15 of the vehicle periphery monitoring device 1 defines, of the points at which the object moving region MR estimated in step ST5 intersects with the main axis S of the road, a point q at the closest side to the self vehicle C along the main axis S of the road, as a point having possibility of the self vehicle C contacting the object M (hereinafter referred to as "contact possibility point") (for example, refer to q1, q3, and q4 in FIG. 7). Thereafter, the contact avoiding process unit 15 estimates the contact possibility, on the basis of a time until the object M reaches the intersection point P (hereinafter referred to as "object reaching time") Tm, and a time until the self vehicle C reaches the contact possibility point q (hereinafter referred to as "self vehicle reaching time") Tc.

After estimating a moving velocity of the object M on the basis of the captured images at a plurality of the time series, the contact avoiding process unit 15 estimates the object reaching time Tm, on the assumption that the moving velocity does not change, from "the moving velocity" and "the distance between the object M and the intersecting point P". The contact avoiding process unit 15 may estimate the moving velocity of the object M, for example, in step ST4 when the estimating unit 13 estimates the moving direction of the object M.

Further, the contact avoiding process unit 15 estimates the self vehicle reaching time Tc, from "a traveling velocity of the self vehicle C at present" obtained by a velocity sensor V installed in the self vehicle C, "an acceleration which is a differential value of the traveling velocity of the self vehicle C", and "a distance between the self vehicle C and the contact possibility point q". At this time, the contact avoiding process unit 15 defines that the traveling velocity and the acceleration of the self vehicle C do not change. Further, in the case where an acceleration sensor which detects the acceleration of the self vehicle C is mounted on the self vehicle C, a detected value of the acceleration sensor may be used as the acceleration of the self vehicle C.

The contact avoiding process unit 15 branches the contact possibility according to a time difference $\Delta T$ which is a difference between the object reaching time Tm and the self vehicle reaching time Tc. More specifically, in order to branch the contact possibility to three according to the level of the contact possibility determined according to the time difference $\Delta T$, the contact avoiding process unit 15 defines two levels, i.e., a first level TL1 which is a predetermined value defined preliminary, and a second level TL2 which is a predetermined value higher than the first level TL1 defined preliminary. The level of contact possibility increases as the time difference $\Delta T$ decreases. Further, in the present embodiment, for example, the first level TL1 is set to approximately 1.6 [sec], and the second level TL2 is set to approximately 0.8 [sec].

And, the contact avoiding process unit 15 is branching to three cases of the case where the level of contact possibility is less than the first level TL1 (no avoiding process is performed as is explained later), the case of equal to or more than the first level TL1 and less than the second level TL2 (perform the avoiding process of step ST12), and the case of equal to or more than the second level TL2 (perform the avoiding process of step ST10). The contact avoiding process unit 15 performs appropriate avoiding process (or does not perform avoiding process) in each of these cases, by the process of step ST9 through ST12.

The first level TL1 and the second level TL2 are determined preliminary by an experiment and the like, and are stored and held in a storage device such as a memory. The first level TL1 in the present embodiment corresponds to a first predetermined level of the present invention, and the second level TL2 corresponds to a second predetermined level of the present invention.

After the process of step ST6 is finished, the process proceeds to step ST7, the third recognizing unit 14 determines whether or not the object M, in which the intersecting point P exists, is a human. The determination is performed, for example, using the output data obtained by the machine learning used in step ST3. Thereafter, in the case where the object M is determined as human in step ST7, the process proceeds to step ST8, and the contact avoiding process unit 15 performs the light distribution control to change the irradiating direction of the headlight 6 of the self vehicle C, so as to include the object M, which is determined as human, in the irradiating range of the headlight 6, that is, to irradiate the range from the front of the self vehicle C to the object M.

Figure 8:
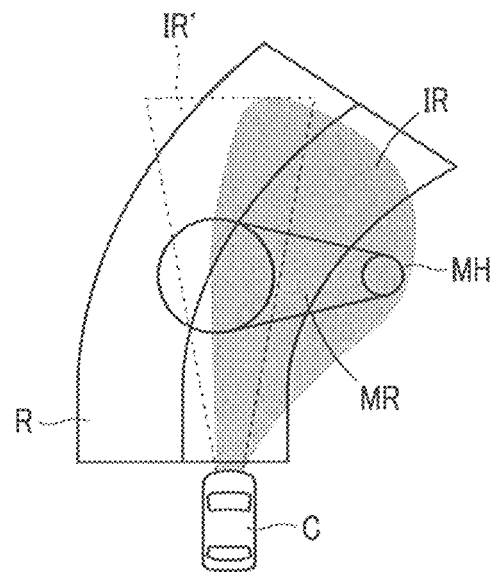
FIG. 8(a) is a view showing an irradiation of a headlight when a human only is present in the periphery, and (b) is a view showing the irradiation of the headlight when the human and an opposing vehicle exist in the periphery.
Figure 8:
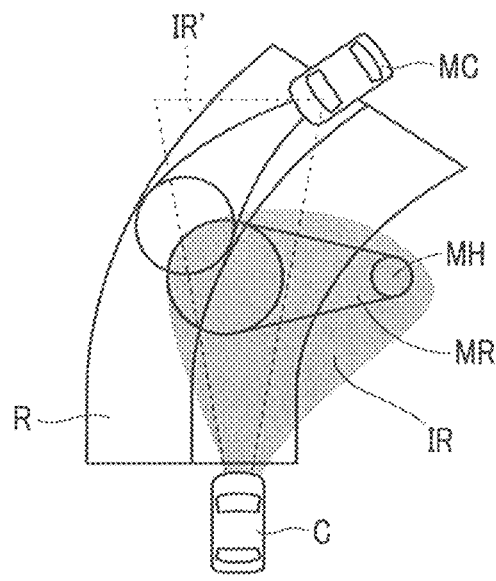

An example of the light distribution control will be explained with reference to FIG. 8. FIG. 8(a) illustrate the situation where an object MH, which is a human, is moving so as to cross from now a road R on which the self vehicle C is traveling. Normally, the self vehicle C is irradiating an irradiating region IR' indicated by broken line with the headlight 6. When the third recognizing unit 14 recognizes the object MH as a human, the irradiating direction is changed from the irradiating region IR' to an irradiating region IR, by performing the light distribution control of the headlight 6. At this time, the irradiating region IR includes the range from the front of the self vehicle C to the object MH, so that a driver of the self vehicle C may recognize the object MH having possibility of contact. By doing so, it becomes possible to increase the effect of avoiding contact of the self vehicle C and the object MH.

Further, in the case where the imaging device is configured from a imaging device using invisible ray as a light source, for example an infrared camera using an infrared ray as the light source, even in the case where the light of the headlight 6 of the self vehicle C is not irradiated to the object MH, and also light outside of the self vehicle C, such as a street lamp, is not irradiated to the object MH, the vehicle periphery monitoring device 1 is capable of estimating the moving direction of the object MH. At this time, when the light of the headlight 6 is irradiated to the object MH by the avoiding process, the driver of the self vehicle C may recognized the position of the object MH, so that the effect of avoiding contact of the self vehicle C and the object MH may be improved.

Even in the case where the imaging device is configured from a camera and the like using visible light as the light source, in the case where the light of the self vehicle C or outside the self vehicle C (street lamp and the like) is irradiated to the object MH, the vehicle periphery monitoring device 1 is capable of estimating the moving direction of the object MH. At this time, when the light of the headlight 6 is irradiated to the object MH by the avoiding process, the object MH is brightly irradiated by the headlight 6 of the self vehicle C in addition to irradiation of light such as the street lamp, so that the driver of the self vehicle C may recognize the position of the object MH better. By doing so, it becomes possible to improve the effect of avoiding contact of the self vehicle C and the object MH.

Further, in the situation as is shown in FIG. 8(a), another example where an oncoming vehicle MC which is traveling opposite to the self vehicle C on the road R on which the self vehicle C is traveling exists, is shown in FIG. 8(b). In such a situation, in order to suppress dizziness given to a driver of the oncoming vehicle MC, the light distribution control which narrows the irradiating region by reducing the light intensity of the headlight 6, and also to change the irradiating region so as to include the object moving region MR of the object MH from the object MH, may be performed.

In the case where the process of step ST8 is finished, or it is determined by the determination in step ST7 that the object M is not human, the process proceeds to step ST9.

In step ST9, it is determined whether or not the contact possibility is equal to or more than the second level TL2. When it is determined in step ST9 that the contact possibility is equal to or more than the second level TL2, then the process proceeds to step ST10. In step ST10, the contact avoiding process unit 15 operates the brake 3 so as to brake the self vehicle C. By operating the brake 3, the self vehicle C is made to decelerate or stop, so that it becomes possible to avoid the self vehicle C from contacting the object M. After the process of step ST10 is finished, a process of one control cycle by the present flow chart is terminated.

When it is determined in step ST9 that the contact possibility is not equal to or more than the second level TL2, the process proceeds to step ST11. In step ST11, it is determined whether or not the contact possibility is equal to or more than the first level TL1.

When it is determined in step ST11 that the contact possibility is equal to or more than the first level TL1, then the process proceeds to step ST12. In step ST12, the contact avoiding process unit 15 performs a process of announcing the possibility of the self vehicle C contacting the object M to the driver of the self vehicle C. By doing so, an image for announcing the possibility of the self vehicle C contacting the object M to the driver is displayed on the display 4, and also a sound for announcing the possibility of contact to the driver is reproduced from the loudspeaker 5.

Figure 9:
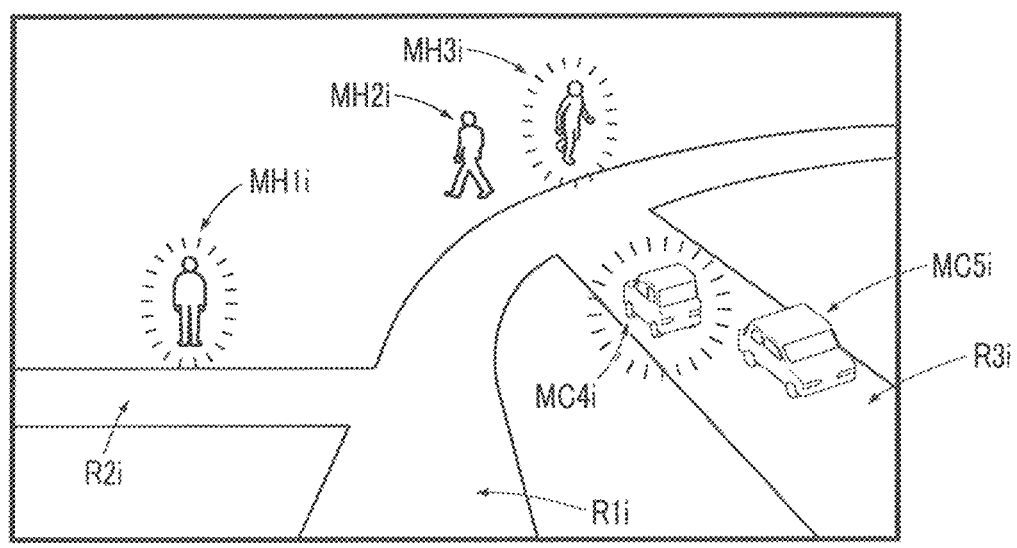
FIG. 9 is a view showing an example of announcing by a display.

With the process of step ST12, the contact avoiding process unit 15 performs highlighting to the display 4, such as, for example as is shown in FIG. 9, flicking the image portion corresponding to the object image Mi having contact possibility (for example, MH1i, MH3i, and MC4i in FIG. 9).

The content of display in FIG. 9 is generated by the vehicle periphery monitoring device 1 as follows. The road is displayed in a simplified shape, on the basis of the shape of the road recognized by step ST1, or the main axis S of the road obtained by step ST2. Further, to each object M, a binarization process and the like is performed to the captured image by the camera 2, a labeling process and the like is performed, each image portion of one or a plurality of the objects M is extracted, and the profile of each object M is displayed in a simple shape. Each object M may be displayed with an image of an icon prepared preliminary according to the classification (human, vehicle, and the like).

Further, the sound reproduced from the loudspeaker 5 by the process of step ST12 may be the one in which the driver of the self vehicle C is capable of grasping the possibility of contacting the object M. For example, it may be reproducing a voice preliminary recorded (for example, "there is a possibility of contact", "please pay attention to XX meters ahead" and the like), or to sound a beeping sound with a frequency or a pattern thereof defined preliminary.

By the contact avoiding process unit 15 performing the process of announcing to the driver of the self vehicle C that there is a possibility of the self vehicle C contacting the object M in step ST12, the driver is capable of becoming aware of the possibility and operate the vehicle so as to avoid contact. By doing so, it becomes possible to avoid the self vehicle C from contacting the object M. After the process of step ST12 is finished, a process of one control cycle by the present flow chart is terminated.

Further, when it is determined in step ST11 that the contact possibility is not equal to or more than the first level TL1, a process of one control cycle by the present flow chart is terminated without performing the avoiding process.

As is explained above, the contact avoiding process unit 15 of the vehicle periphery monitoring device 1 performs the avoiding process according to the shape of the road in the traveling direction of the self vehicle C recognized by the first recognizing unit 11, in addition to the moving direction of the object estimated by the estimating unit 13, it becomes possible to appropriately determine whether or not to perform the avoiding process for avoiding the self vehicle C from contacting the object M.

Further, the contact avoiding process unit 15 estimates the region MR in which the object M is to move from now, according to the moving direction of the object M estimated by the estimating unit 13. And, the avoiding process is performed in the case where the estimated region MR crosses the course of the self vehicle C estimated on the basis of the shape of the road recognized by the first recognizing unit 11 (that is, the main axis S of the road).

In the above-mentioned embodiment, the contact avoiding process unit 15 does not estimate the region MR for the pedestrian MH2 and the other vehicle MC5, because the intersecting point P does not exist. That is, the intersecting point P does not exist in the pedestrian MH2 and the other vehicle MC5, so that it is conceivable that the possibility of the self vehicle C contacting the object MH2 and MC5 is extremely low. On the other hand, the intersecting point P exists in the pedestrian MH1, the pedestrian MH3 and the other vehicle MC4, so that it is conceivable that there is a possibility of the self vehicle C contacting the object MH1, MH3, and MC4.

Therefore, by not performing the avoiding process to the object MH2 and MC5 with extremely low contact possibility, and to perform avoiding process with respect to the objects having contact possibility, it becomes possible to perform the avoiding process appropriately.

Further, with the process of step ST9 through step ST12, the avoiding process to be executed is changed, according to the level of the contact possibility estimated by the process of step ST6. More specifically, the contact avoiding process 15 of the vehicle periphery monitoring device 1 does not perform the avoiding process when the level of contact possibility is less than the first level TL1 (that is, when the contact possibility is extremely low), performs the avoiding process of announcing to the driver (display to the display 4 and reproduce sound from the loudspeaker 5) when the level of the contact possibility is equal to or more than the first level TL1 and less than the second level TL2 (that is, when the contact possibility is low), and performs the avoiding process of operating the brake 3 and decelerate the traveling speed of the vehicle when the level of contact possibility is equal to or more than the second level TL2 (that is, when the contact possibility is high).

As such, by the contact avoiding process unit 15 performing the appropriate avoiding process according to the contact possibility, it becomes possible to restrict the avoiding process more than necessary from being performed, such as decelerating the traveling speed of the vehicle in a stage where the contact possibility is still low (for example, in the case where the level of contact possibility is equal to or more than the first level TL1 and less than the second level TL2), according to the state of the self vehicle C.

(Variation)

In the present embodiment, the vehicle periphery monitoring device 1 is equipped with the third recognizing unit 14, and the contact avoiding process unit 15 of the vehicle periphery monitoring device 1 performs the process of changing the irradiating range of the headlight 6 when the object M is a human. However, even in the case where this process is not performed, the effect of the present invention that it is possible to appropriately determine whether or not to perform the avoiding process of avoiding the vehicle from contacting the object may be obtained.

In the present embodiment, in the process of step ST5, the intersecting point P between the straight line indicating the moving direction of each object M estimated in step ST4 (for example, d1, d3 and d4 in FIG. 7) and the main axis S of the road extracted in step ST2 is obtained, from each object M, and the contact possibility of the object M in which the intersecting point P exists is estimated. However, the method for determining whether or not to estimate the contact possibility is not limited thereto, and may be other method as long as it is based on the relationship between the shape of the road and the moving direction of the object M.

Figure 10:
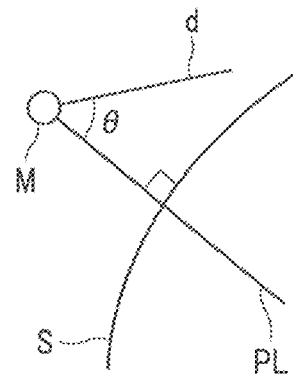
FIG. 10 is a view showing a method of determining whether or not to estimate the contact possibility by another embodiment, and (a) is a view showing an example of estimating the contact possibility, (b) is a view showing an example of not estimating the contact possibility, and (c) is a view showing an example of estimating the contact possibility different from (a)
Figure 10:
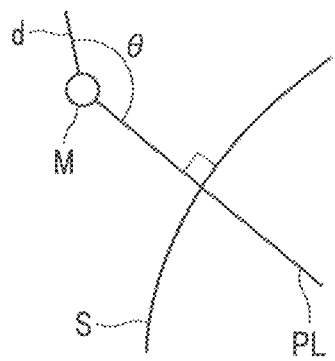
Figure 10:
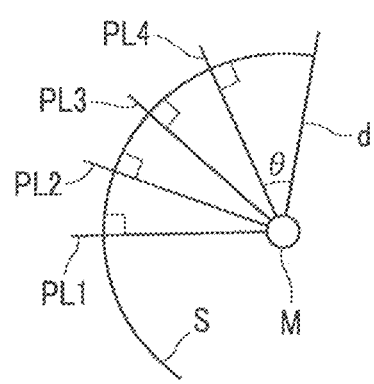

An example of such other method will be explained with reference to FIG. 10(*a*). For example, the contact avoiding process unit 15 may estimate the contact possibility of the object M, in the case where an angle θ between the straight line d indicating the moving direction of each object M and a perpendicular line PL extended from the object M to the main axis S of the road is equal to or smaller than a predetermined angle. The predetermined angle is set, for example, to 90° and the like. By doing so, for example as is shown in FIG. 10(*b*), in the case where the angle θ between the straight line d and the perpendicular line PL is larger than the predetermined angle (for example, 90°), the object M is moving in a direction departing from the course of the self vehicle C, so that it is conceivable that the possibility of the self vehicle C contacting the object M is extremely low. Therefore, the contact avoiding process unit 15 does not estimate the contact possibility.

Further, in this case, as is shown in FIG. 10(*c*), in the case where a plurality of the perpendicular lines PL are defined, such as when the object M is positioned inside a curve of the road R of a curved shape, it is sufficient to determine whether or not a smallest angle among a plurality of angles θ between each perpendicular line PL and the straight line d (for example, an angle θ between a perpendicular line PL4 and the straight line d) is equal to or smaller than the predetermined angle.

Further, even in the case where the object M is stopping, the contact avoiding process unit 15 may determine whether or not to estimate the contact possibility, for example as is explained below, taking into consideration the situation where the object M suddenly moves. The estimating unit 13 determines that the object M is stopping, when a change amount of the position of the object M in captured images at a plurality of time series (different times) is equal to or less than a predetermined value. The predetermined value is set to a value in which it is difficult to estimate the moving direction of the object M.

When an angle between the straight line indicating the orientation of each object M recognized by step ST3 and the perpendicular line PL is equal to or smaller than 90°, the contact avoiding process unit 15 calculates a time when the object M reaches the intersecting point P where the object M crosses the main axis S of the road, on the basis of a moving velocity and an acceleration of each object M defined preliminary.

At this time, for example when the object M is recognized as a human, the contact avoiding process unit 15 defines the moving velocity to a human's average moving velocity of, for example, 4 [km], and defines the acceleration, for example to 0.05 G (where G is a gravitational acceleration). Further, when the object M is recognized as a vehicle, the contact avoiding process unit 15 defines the moving velocity to, for example, 10 [km], and define the acceleration to, for example, 0.3 G.

Thereafter, a time until the self vehicle C reaches, of the intersecting point P or the points where a circle from the intersecting point P, taking half the length of a width W of the self vehicle C as a radius, crosses the main axis S of the road, a point closest to the self vehicle C along the main axis S of the road, is calculated. And, it is determined that the possibility of contact is higher, as a difference between the calculated time and the time the object M is calculated as above to reach the intersecting point P is smaller.

As is explained above, the contact avoiding process unit 15 is capable of estimating the possibility of the self vehicle C contacting the object M. Also, at this time, the moving velocity and the acceleration of the object M is arbitrarily defined according to the classification of the object M (human or vehicle and the like), so that it is capable to estimate the contact possibility with higher precision.

Further, the moving region MR of the object M is not limited to the one in the present embodiment explained above, and may be others as long as it is capable of estimating appropriately the contact possibility of the self vehicle C and the object M.

Further, in the present embodiment, as the object M, explanation is given taking an example of five objects M that are either of the human and the vehicle. However, it is not limited thereto. The object M may be any movable object other than the human and the vehicle (for example, animals, objects that are moved by wind, and the like). Further, in the explanation of the present embodiment, the vehicle as the object M is traveling on the road. However, it is not limited thereto. For example, even in the case where the vehicle is parked outside the road (for example, the pedestrian MH1 in FIG. 3 is not a human and is a vehicle, and the like), it becomes possible to perform the above-mentioned avoiding process appropriately, by estimating the moving direction of the vehicle.

Further, the avoiding process is not limited to the one mentioned in the explanation of above-mentioned embodiment, and may be other process as long as it is a process for avoiding contact between the self vehicle C and the object M.

For example, it may be a process of vibrating a member attached to a part of a body of the driver of the self vehicle C, and the like.

Further, for example, when it is determined in step ST9 that the contact possibility is equal to or more than the second level TL2, the announcing to the driver by the display of information by the display 4 and the reproduction of the sound from the loudspeaker 5 that are shown in step ST12 may also be performed, in addition to operating the brake 3.

For example, as another example of the avoiding process, a process of controlling a steering angle of the self vehicle C is conceivable. The process is a process of controlling a steering angle so as to avoid the object M, when there is a possibility that the self vehicle C contacts the object M. In the case where there is an opposing vehicle, the above-mentioned control of the steering angle is not performed, and a control of decreasing the traveling speed of the self vehicle C or slowing down the self vehicle C is performed. By doing so, it becomes possible to reduce the possibility of the self vehicle C contacting the object M.

Further, as another example of the avoiding process, a process of decreasing an output torque of a driving source of the vehicle C may be performed. The process is, for example, in the case where the driving source of the self vehicle C is an internal combustion engine, a process of decreasing an air intake amount (for example, decreasing the throttle valve opening), and the like. By doing so, the self vehicle C decelerates, and it becomes possible to reduce the possibility of the self vehicle C contacting the object M.

The avoiding process may be the one combining a plurality of the various avoiding processes as is explained above on the basis of the situation (for example, the magnitude of the contact possibility, and the like), and may be the one performing any one of the avoiding processes.

Further, using the configuration of the present embodiment, when there are a plurality of the objects M existing, in the case where at least one object M is an other vehicle that is configured to be able to communicate with the self vehicle C wirelessly, and the other vehicle is of a configuration capable of announcing a predetermined information to a driver of the other vehicle, then a process as is explained below may be performed.

Figure 11:
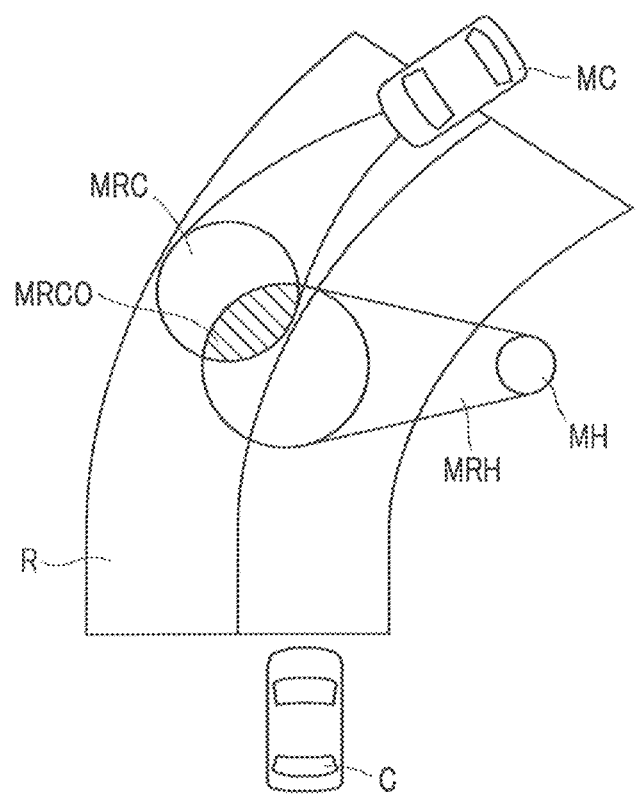
FIG. 11 is a view showing announcing the opposing vehicle equipped with the vehicle periphery monitoring device similar to that of the self vehicle, that there is a possibility of contacting a human.

For example, as is shown in FIG. 11, an explanation will be given on the situation where the oncoming vehicle MC (the object M) which is a vehicle traveling opposing the self vehicle C exists on the road R on which the self vehicle C is traveling, and a pedestrian MH (the object M) in the side of the road R is moving so as to cross the road R from now. At this time, the oncoming vehicle MC is equipped with, as is explained above, a communicating means for communicating with the self vehicle C wirelessly, and an announcing means (for example, a display and a loudspeaker as is in the self vehicle C, and the like) for announcing a predetermined information to a driver of the oncoming vehicle MC.

Thereafter, in the case where the contact avoiding process unit 15 of the self vehicle C detects that a region MRCO which is common to the object moving region MRC, MRH of the object MC, MH estimated by the process of step ST5 exists, the vehicle periphery monitoring device 1 of the self vehicle C notifies the oncoming vehicle MC that there is a possibility of the oncoming vehicle MC contacting the pedestrian MH, by wireless communication. Thereafter, on the basis of the notice obtained by the communicating means, the oncoming vehicle MC notifies the driver of the oncoming vehicle MC with the announcing means. By doing so, the driver of the oncoming vehicle MC may increase the effect of avoiding contact with the pedestrian MH which is a different object than the oncoming vehicle MC. This process is especially valuable, in the case where, for example an obstacle exists between the oncoming vehicle MC and the pedestrian MH.

What is claimed is:

1. A vehicle periphery monitoring device which monitors an object existing in a periphery of a vehicle, comprising:
   a first recognizing unit which recognizes a shape of a road in a traveling direction of the vehicle;
   a second recognizing unit which recognizes a position of an object existing in a periphery of the vehicle;
   an estimating unit which estimates a traveling direction of the object from the position recognized by the second recognizing unit;
   an imaging device which captures an image of the periphery of the vehicle; and
   a contact avoiding process unit which determines whether or not to perform an avoiding process for avoiding contact of the vehicle and the object, based on whether a relationship between the shape of the road recognized by the first recognizing unit, and the traveling direction of the object estimated by the estimating unit satisfies predetermined criteria or not;
   wherein the second recognizing unit also recognizes an orientation of the object based on the image captured by the imaging device;

the estimating unit estimates the traveling direction of the object also based on the orientation of the object recognized by the second recognizing unit, when an amount of change of the position of the object at different times as recognized by the second recognizing unit, is equal to or less than a predetermined value; and the estimating unit also estimates a change of direction of the position of the object at the different times as the traveling direction of the object, when the amount of change of the position of the object at the different time points is greater than the predetermined value.

2. The vehicle periphery monitoring device according to claim 1, wherein the contact avoiding process unit estimates a region in which the object moves according to the traveling direction of the object estimated by the estimating unit, and determines whether or not to perform the avoiding process, when the estimated region crosses a course of the vehicle estimated based on the shape of the road recognized by the first recognizing unit.

3. The vehicle periphery monitoring device according to claim 2, wherein the contact avoiding process unit determines not to perform the avoiding process, when the estimated region does not cross the estimated course of the vehicle.

4. The vehicle periphery monitoring device according to claim 1, wherein the contact avoiding process unit estimates a region in which the object moves according to the traveling direction of the object estimated by the estimating unit, and determines not to perform the avoiding process when the estimated region does not cross a course of the vehicle estimated based on the shape of the road recognized by the first recognizing unit.

5. The vehicle periphery monitoring device according to claim 2, wherein the contact avoiding process unit changes a content of the avoiding process, according to a level of contact possibility estimated based on the estimated course of the vehicle, the estimated region, a velocity of the vehicle, and a velocity of the object.

6. The vehicle periphery monitoring device according to claim 5, wherein the contact avoiding process unit performs a process of announcing by an announcing device equipped to the vehicle, as the avoiding process, when the level of contact possibility is equal to or more than a first predetermined level, and performs a process of braking the vehicle with a braking device equipped to the vehicle, as the avoiding process, when the level is equal to or more than a second predetermined level which is higher than the first predetermined level.

7. The vehicle periphery monitoring device according to claim 1, further comprising a third recognizing unit which recognizes whether or not the object recognized by the second recognizing unit is a human, and wherein the contact avoiding process unit performs a process of making an irradiating direction of a headlight equipped to the vehicle to a direction in which the human is irradiated, as the avoiding process, when the object is recognized as the human by the third recognizing unit.

8. The vehicle periphery monitoring device according to claim 4, wherein the contact avoiding process unit changes a content of the avoiding process, according to a level of contact possibility estimated based on the estimated course of the vehicle, the estimated region, a velocity of the vehicle, and a velocity of the object.

9. The vehicle periphery monitoring device according to claim 8, wherein the contact avoiding process unit performs a process of announcing by an announcing device equipped to the vehicle, as the avoiding process, when the level of contact possibility is equal to or more than a first predetermined level, and performs a process of braking the vehicle with a braking device equipped to the vehicle, as the avoiding process, when the level is equal to or more than a second predetermined level which is higher than the first predetermined level.

10. The vehicle periphery monitoring device according to claim 2, wherein the contact avoiding process unit estimates the region in which the object moves primarily based on the position of the object, the traveling direction of the object estimated by the estimating unit and the shape of the road in the travelling direction.

11. The vehicle periphery monitoring device according to claim 3, wherein the contact avoiding process unit estimates the region in which the object moves primarily based on the position of the object, the traveling direction of the object estimated by the estimating unit and the shape of the road in the travelling direction.

12. A vehicle periphery monitoring device which monitors an object existing in a periphery of a vehicle, comprising:

a first recognizing unit which recognizes a shape of a road in a traveling direction of the vehicle;

a second recognizing unit which recognizes a position of an object existing in a periphery of the vehicle;

an estimating unit which estimates a traveling direction of the object from the position recognized by the second recognizing unit; and a contact avoiding process unit which determines whether or not to perform an avoiding process for avoiding contact of the vehicle and the object, based on whether a relationship between the shape of the road recognized by the first recognizing unit, and the traveling direction of the object estimated by the estimating unit satisfies predetermined criteria or not;

wherein the contact avoiding process unit estimates a region in which the object moves according to the traveling direction of the object estimated by the estimating unit, and determines whether or not to perform the avoiding process, when the estimated region crosses a course of the vehicle estimated based on the shape of the road recognized by the first recognizing unit; and wherein the region estimated by the contact avoiding process unit is substantially fan shaped, extends from the object to an intersection point of a line of the estimated traveling direction of the object and a main axis of the road, and increases in width from the object to the intersection point.

13. The vehicle periphery monitoring device according to claim 12, wherein the contact avoiding process does not estimate the region when the line of the estimated traveling direction of the object does not intersect the main axis of the road.

14. A vehicle periphery monitoring device which monitors an object existing in a periphery of a vehicle, comprising:

a first recognizing unit which recognizes a shape of a road in a traveling direction of the vehicle;

a second recognizing unit which recognizes a position of an object existing in a periphery of the vehicle;

an estimating unit which estimates a traveling direction of the object from the position recognized by the second recognizing unit; and a contact avoiding process unit which determines whether or not to perform an avoiding process for avoiding contact of the vehicle and the object, based on whether a relationship between the shape of the road recognized by the first recognizing unit, and the traveling direction of the object estimated by the estimating unit satisfies predetermined criteria or not;

wherein the contact avoiding process unit estimates a region in which the object moves according to the traveling direction of the object estimated by the estimating unit, and determines not to perform the avoiding process when the estimated region does not cross a course of the vehicle estimated based on the shape of the road recognized by the first recognizing unit; and wherein the region estimated by the contact avoiding process unit is substantially fan shaped, extends from the object to an intersection point of a line of the estimated traveling direction of the object and a main axis of the road, and increases in width from the object to the intersection point.

15. The vehicle periphery monitoring device according to claim 14, wherein the contact avoiding process does not estimate the region when the line of the estimated traveling direction of the object does not intersect the main axis of the road.

* * * * *